(12) United States Patent
Sun et al.

(10) Patent No.: US 11,102,062 B2
(45) Date of Patent: Aug. 24, 2021

(54) CONFIGURATION METHOD AND CORRESPONDING APPARATUS

(71) Applicant: HUAWEI TECHNOLOGIES CO., LTD., Guangdong (CN)

(72) Inventors: Wenqi Sun, Shenzhen (CN); Ruobing Jiang, Shenzhen (CN); Wei Lu, Shenzhen (CN); Shuigen Yang, Shanghai (CN); Wei Tan, Shanghai (CN); Zhenni Feng, Shenzhen (CN)

(73) Assignee: HUAWEI TECHNOLOGIES CO, , LTD, Guangdong (CN)

(*) Notice: Subject to any disclaimer, the term of this patent is extended or adjusted under 35 U.S.C. 154(b) by 0 days.

(21) Appl. No.: 16/799,492

(22) Filed: Feb. 24, 2020

(65) Prior Publication Data
US 2020/0235989 A1 Jul. 23, 2020

Related U.S. Application Data

(63) Continuation of application No. PCT/CN2018/100647, filed on Aug. 15, 2018.

(30) Foreign Application Priority Data

Sep. 4, 2017 (CN) .......................... 201710786862.5

(51) Int. Cl.
H04L 12/24 (2006.01)
H04B 7/0413 (2017.01)
(Continued)

(52) U.S. Cl.
CPC ....... H04L 41/0806 (2013.01); H04B 7/0413 (2013.01); H04B 7/0617 (2013.01);
(Continued)

(58) Field of Classification Search
CPC ............. H04L 41/0806; H04L 41/0893; H04L 41/5051; H04W 76/10; H04W 28/26;
(Continued)

(56) References Cited

U.S. PATENT DOCUMENTS

2014/0315560 A1* 10/2014 Smith .................... H04W 16/14
455/450
2017/0070892 A1* 3/2017 Song ..................... H04L 41/042
(Continued)

FOREIGN PATENT DOCUMENTS

CN 106060900 A 10/2016
CN 106954267 A 7/2017
(Continued)

OTHER PUBLICATIONS

3GPP TR 28.801 V1.2.0: 3GPP TSG SA Telecommunication management; Study on management and orchestration of network slicing for next generation network (Release 15), Jun. 14, 2017, total 79 pages.
(Continued)

Primary Examiner — Fred A Casca
(74) Attorney, Agent, or Firm — Womble Bond Dickinson (US) LLP

(57) ABSTRACT

A configuration method and a corresponding apparatus are provided, to provide a mechanism for configuring, for a RAN, a network slice supported by the RAN. The configuration method includes: sending, by a first network management device, network slice configuration information to a second network management device, where the network slice configuration information includes information that indicates a network slice supported by the access network RAN, and the second network management device has a function of configuring the RAN; and receiving, by the first network management device, a message that is returned by
(Continued)

the second network management device and that indicates that configuration the RAN is completed.

5 Claims, 6 Drawing Sheets

(51) Int. Cl.

| | | |
|---|---|---|
| *H04B 7/06* | (2006.01) | |
| *H04B 7/08* | (2006.01) | |
| *H04B 7/185* | (2006.01) | |
| *H04W 8/18* | (2009.01) | |
| *H04W 16/14* | (2009.01) | |
| *H04W 16/28* | (2009.01) | |
| *H04W 28/16* | (2009.01) | |
| *H04W 36/08* | (2009.01) | |
| *H04W 48/16* | (2009.01) | |
| *H04W 36/06* | (2009.01) | |
| *H04W 36/18* | (2009.01) | |
| *H04W 84/06* | (2009.01) | |

(52) U.S. Cl.
CPC ......... *H04B 7/0626* (2013.01); *H04B 7/0695* (2013.01); *H04B 7/0697* (2013.01); *H04B 7/088* (2013.01); *H04B 7/18504* (2013.01); *H04B 7/18506* (2013.01); *H04L 41/0893* (2013.01); *H04L 41/5051* (2013.01); *H04W 8/18* (2013.01); *H04W 16/14* (2013.01); *H04W 16/28* (2013.01); *H04W 28/16* (2013.01); *H04W 36/08* (2013.01); *H04W 48/16* (2013.01); *H04W 36/06* (2013.01); *H04W 36/18* (2013.01); *H04W 84/06* (2013.01)

(58) Field of Classification Search
CPC . H04W 72/04; H04W 48/18; H04W 41/0806; H04W 8/18; H04W 16/14; H04W 16/28; H04W 28/16; H04W 36/08; H04W 48/16; H04W 36/06; H04W 36/18; H04W 84/06; H04W 16/02; H04W 24/02; Y02D 70/10; H04B 7/0413; H04B 7/0617; H04B 7/0626; H04B 7/0695; H04B 7/0697; H04B 7/088; H04B 7/18504; H04B 7/18506
See application file for complete search history.

(56) References Cited

U.S. PATENT DOCUMENTS

| | | | | |
|---|---|---|---|---|
| 2017/0332212 A1* | 11/2017 | Gage | .................. | H04L 41/0806 |
| 2018/0270666 A1* | 9/2018 | Lee | ....................... | H04L 9/3242 |
| 2019/0182752 A1 | 6/2019 | Lou et al. | | |
| 2019/0289475 A1* | 9/2019 | Hedman | ............... | H04W 24/02 |
| 2019/0327149 A1 | 10/2019 | Sun et al. | | |

FOREIGN PATENT DOCUMENTS

| | | |
|---|---|---|
| CN | 107071799 A | 8/2017 |
| CN | 107770794 A | 3/2018 |
| CN | 108076471 A | 5/2018 |
| CN | 108282352 A | 7/2018 |
| WO | 2017063708 A1 | 4/2017 |
| WO | 2017121454 A1 | 7/2017 |

OTHER PUBLICATIONS

Huawei: "Configuration of RAN Transport network related information", 3GPP Draft; S5-171664, Mar. 25, 2017 (Mar. 25, 2017), XP051248760, total 4 pages.

Huawei, "Add requirements of management support for RAN configuration", 3GPP TSG SA WG5 (Telecom Management) Meeting #113, S5-173436, May 8-12, 2017, West Palm Beach, Florida (US), revision of S5-173147, total 4 pages.

3GPP TS 23.501 V1.2.0 (Jul. 2017), 3rd Generation Partnership Project; Technical Specification Group Services and System Aspects; System Architecture for the 5G System; Stage 2 (Release 15), total 166 pages.

3GPP TSG SA WG5 (Telecom Management) Meeting #112, S5-171756: "pCR 28.801 Rapporteur update on requirements", Ericsson, Mar. 27-31, 2017, Guilin (China), total 7 pages.

Ericsson: "NSSF and Slice selection during the Registration procedures", 3GPP Draft; S2-175216, Jul. 3, 2017 (Jul. 3, 2017), XP051310199, total 12 pages.

3GPP TS 32.62 V11.7.0 (Mar. 2014), 3rd Generation Partnership Project; Technical Specification Group Services and System Aspects; Telecommunication management; Evolved Universal Terrestrial Radio Access Network (E-UTRAN) Network Resource Model (NRM) Integration Reference Point (IRP); Information Service (IS) (Release 11), total 59 pages.

3GPP TSG SA WG5 (Telecom Management) Meeting #112, S5-171920: "pCR TR 28.801 Management support for RAN configuration", China Mobile, Mar. 27-31, 2017, Guilin, China, total 3 pages.

China Mobile: "pCR TR 28.801 Management support for RANconfiguration", 3GPP Draft; S5-171920, Apr. 3, 2017 (Apr. 3, 2017), XP051259155, total 4 pages.

3GPP TS 36.300 V14.3.0 (Jun. 2017), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14), total 331 pages.

3GPP TS 36.423 V14.3.0 (Jun. 2017), 3rd Generation Partnership Project; Technical Specification Group Radio Access Network; Evolved Universal Terrestrial Radio Access Network (E-UTRAN); X2 application protocol (X2AP) (Release 14), total 242 pages.

3GPP TS 38.300 V1.0.0 (Sep. 2017), 3rd Generation Partnership Project; Technical Specification Group Radio Access Network; NR; NR and NG-RAN Overall Description; Stage 2 (Release 15), total 59 pages.

3GPP TS 38.413 V0.2.0 (Jul. 2017), 3rd Generation Partnership Project; Technical Specification Group Radio Access Network; NG Radio Access Network (NG-RAN); NG Application Protocol (NGAP) (Release 15), total 81 pages.

3GPP TS 38.423 V0.2.0 (Jun. 2017), 3rd Generation Partnership Project; Technical Specification Group Radio Access Network; NG Radio Access Network (NG-RAN); Xn application protocol (XnAP) (Release 15), total 57 pages.

3GPP TSG SA WG5 Telecom Management Meeting #114 ,S5-174396,Huawei,pCR 28.800 Key issues to be considered for 5G NF management architecture options ,Aug. 25, 2017,total 6 pages.

* cited by examiner

CONFIGURATION METHOD AND CORRESPONDING APPARATUS

CROSS-REFERENCE TO RELATED APPLICATIONS

This application is a continuation of International Application No. PCT/CN2018/100647, filed on Aug. 15, 2018, which claims priority to Chinese Patent Application No. 201710786862.5, filed on Sep. 4, 2017. The disclosures of the aforementioned applications are hereby incorporated by reference in their entireties.

TECHNICAL FIELD

This application relates to the field of communications technologies, and in particular, to a configuration method and a corresponding apparatus.

BACKGROUND

A network slice (NS) is a logical network customized based on a service requirement and a physical or virtual network infrastructure. Network slices supported by different radio access network (RAN) devices in a network may be different. In a plurality of scenarios, a RAN device needs to learn of information about a network slice supported by the RAN device. For example, the RAN device needs to send, to an access and mobility management function (AMF), information about a network slice supported by the RAN device, so that the AMF configures a tracking area identity (TAI) list for the RAN device. For another example, neighboring RAN devices may need to exchange information about network slices supported by the nodes, so that the RAN devices perform slice-aware handover management. However, in the prior art, there is no mechanism for configuring, for a RAN device, a network slice supported by the RAN device.

SUMMARY

This application provides a configuration method and a corresponding apparatus, to provide a mechanism for configuring, for a RAN, a network slice supported by the RAN.

According to a first aspect, this application provides a configuration method, including: sending, by a first network management device, network slice configuration information to a second network management device, so that the second network management device delivers the network slice configuration information to a RAN, where the network slice configuration information includes information that indicates a network slice supported by the RAN, the first network management device may be a module for managing a network slice, a module for managing a network slice subnet, a module for managing an entire network, or the like, and the second network management device has a function of configuring the RAN; and receiving, by the first network management device, a message that is returned by the second network management device and that indicates that configuration of the RAN is completed.

In the foregoing technical solution, the first network management device is responsible for forming network slice configuration information for configuring a network slice of a RAN device, and may send network slice configuration information of one or more RAN devices to the second network management device instead of directly delivering the network slice configuration information to the RAN device; and the second network management device is responsible for delivering network slice configuration information corresponding to a RAN device to the RAN device. In this way, a network slice supported by the RAN device can be configured; in addition, because responsibilities of the first network management device and the second network management device are specific, load of the first network management device and load of the second network management device are not excessively heavy, so that a system for configuring a network slice can efficiently operate.

With reference to the first aspect, the information that indicates the network slice supported by the RAN includes: information that indicates a network slice supported by each TAI configured for each cell of the RAN. Based on this embodiment, the network slice configuration information is used to configure a supported network slice for each TAI of each cell of the RAN. Because a TAI is configured for a cell in a conventional configuration manner, fewer modifications are made to a conventional method and configuration content, implementation costs are lower.

With reference to the first aspect, the information that indicates the network slice supported by the RAN includes: information that indicates a network slice supported by each tracking area identity TAI configured for the RAN. Based on this embodiment, the RAN may configure, based on network slice configuration information, a network slice supported by each TAI, and configure the network slice only once for each TAI. This avoids repeatedly indicating, for a same TAI of different cells, a network slice supported by the TAI, reduces a data volume of the network slice configuration information, reduces a time consumed in transmission of the network slice configuration information and consumption of transmission resources, and improves configuration efficiency.

In one embodiment, the information about the network slice includes single network slice selection assistance information (S-NSSAI).

In one embodiment, the network slice configuration information further includes information that indicates a usable frequency of the network slice supported by the RAN. In this embodiment, the RAN can configure both supported network slices and usable frequencies of the network slices.

In one embodiment, after the first network management device sends the network slice configuration information to the second network management device, the first network management device further sends spectrum configuration information to the second network management device, where the spectrum configuration information is used to indicate a usable frequency of the network slice supported by the RAN. In this embodiment, only the usable frequency of the network slice can be configured. The configuration manner is flexibly implemented, and facilitates adjustment of available frequencies corresponding to some or all S-NSSAIs of the RAN.

In one embodiment, the network slice configuration information further includes information that indicates at least one TAI configured for each cell of the RAN. In this embodiment, the RAN may configure a TAI of a cell and a supported network slice together based on network slice configuration information, and therefore efficiency is comparatively high.

In one embodiment, before the first network management device sends the network slice configuration information to the second network management device, the first network management device further sends tracking-area configuration information to the second network management device, where the tracking-area configuration information is used to indicate the information about the at least one TAI configured for each cell of the RAN. This embodiment facilitates adjustment of the network slice supported by the RAN.

In one embodiment, the first network management device is a network manager (NM) or a network slice management function (NSMF) module, and the second network management device is an element manager (EM) or a network function (NF) manager; or the first network management device is an NSMF module, the second network management device is a network slice subnet management function (NSSMF) module, and an EM or an NF manager is integrated into the NSSMF module; or the first network management device is an NSSMF module, and the second network management device is an EM or an NF manager. In this embodiment of the present application, implementations of the first network management device and the second network management device are diversified and flexible, and can be applicable to communications networks in a plurality of scenarios.

In one embodiment, before the first network management device sends the network slice configuration information to the second network management device, the first network management device generates or receives the network slice configuration information. In this embodiment, the manner in which the first network management device obtains the network slice configuration information is flexible, which helps achieve or improve efficiency of configuring the network slice of the RAN device.

According to a second aspect, this application provides a configuration method, including: sending, by a second network management device, network slice configuration information to a RAN, where the network slice configuration information includes information that indicates a network slice supported by the RAN; and receiving, by the second network management device, a message that is returned by the RAN and that indicates that configuration of the network slice is completed. In this embodiment, the second network management device sends the network slice configuration information to the RAN, so that the RAN can configure a network slice based on the network slice configuration information.

With reference to the second aspect, the information that indicates the network slice supported by the RAN includes: information that indicates a network slice supported by each TAI configured for each cell of the RAN. Based on this embodiment, the network slice configuration information is used to configure a supported network slice for each TAI of each cell of the RAN. Because a TAI is configured for a cell in a conventional configuration manner, in this embodiment, fewer modifications are made to a conventional method and configuration content, implementation costs are lower.

In one embodiment, the information that indicates the network slice supported by the RAN includes: information that indicates a network slice supported by each tracking area identity TAI configured for the RAN. Based on this embodiment, the RAN may configure, based on network slice configuration information, a network slice supported by each TAI, and configure the network slice only once for each TAI. This avoids repeatedly indicating, for a same TAI of different cells, a network slice supported by the TAI, reduces a data volume of the network slice configuration information, reduces a time consumed in transmission of the network slice configuration information and consumption of transmission resources, and improves configuration efficiency.

In one embodiment, the information about the network slice includes S-NSSAI.

In one embodiment, the network slice configuration information further includes information that indicates a usable frequency of the network slice supported by the RAN. In this embodiment, the RAN can configure both supported network slices and usable frequencies of the network slices.

In one embodiment, after the second network management device sends the network slice configuration information to the RAN, the second network management device further sends spectrum configuration information to the RAN, where the spectrum configuration information is used to indicate a usable frequency of the network slice supported by the RAN. In this embodiment, only the usable frequency of the network slice can be configured. The configuration manner is flexibly implemented, and facilitates adjustment of available frequencies corresponding to some or all S-NSSAIs of the RAN.

In one embodiment, the network slice configuration information further includes information that indicates at least one TAI configured for each cell of the RAN. In this embodiment, the RAN may configure a TAI of a cell and a supported network slice together based on network slice configuration information, and therefore efficiency is comparatively high.

In one embodiment, before the second network management device sends the network slice configuration information to the RAN, the second network management device sends tracking-area configuration information to the RAN, where the tracking-area configuration information is used to indicate the information about the at least one TAI configured for each cell of the RAN. This embodiment facilitates adjustment of the network slice supported by the RAN.

In one embodiment, before the second network management device sends the network slice configuration information to the RAN, the second network management device further receives the network slice configuration information sent by the first network management device. In this embodiment, the first network management device may send network slice configuration information of a plurality of RAN devices to the second network management device, and the second network management device delivers the network slice configuration information of the RAN devices to the RAN devices one by one. The network slices supported by the RANs are efficiently configured by using the foregoing layer-2 architecture.

In one embodiment, after the second network management device receives the message that is returned by the RAN and that indicates that configuration of the network slice is completed, the second network management device further sends, to the first network management device, a message that indicates that configuration of the RAN is completed. In this embodiment, the second network management device may feed back a network slice configuration result to the first network management device, so that the first network management device can learn of an actual configuration status of the network slice configuration information delivered by the first network management device.

According to a third aspect, this application provides a configuration method, including: receiving, by a RAN, network slice configuration information sent by a network management device, where the network slice configuration information includes information that indicates a network slice supported by the RAN, and the network management device has a function of configuring the RAN; and after configuring the supported network slice based on the network slice configuration information, returning, by the RAN to the network management device, a message that indicates that configuration of the network slice is completed. In this embodiment, the RAN may configure a network slice based on the received network slice configuration information.

In one embodiment, the information that indicates the network slice supported by the RAN includes: information that indicates a network slice supported by each TAI configured for each cell of the RAN. Based on this embodiment, the RAN may configure, based on network slice configuration information, a network slice supported by each TAI of each cell.

In one embodiment, the information that indicates the network slice supported by the RAN includes: information that indicates a network slice supported by each tracking area identity TAI configured for the RAN. Based on this embodiment, the RAN may configure, based on network slice configuration information, a network slice supported by each TAI, and configure the network slice only once for each TAI. This avoids repeatedly indicating, for a same TAI of different cells, a network slice supported by the TAI, reduces a data volume of the network slice configuration information, reduces a time consumed in transmission of the network slice configuration information and consumption of transmission resources, and improves configuration efficiency.

In one embodiment, the information about the network slice includes S-NSSAI.

In one embodiment, the network slice configuration information further includes information that indicates a usable frequency of the network slice supported by the RAN.

In one embodiment, after the RAN receives the network slice configuration information sent by the network management device, the RAN further receives spectrum configuration information sent by the network management device, where the spectrum configuration information is used to indicate a usable frequency of the network slice supported by the RAN.

In one embodiment, the network slice configuration information further includes information that indicates at least one TAI configured for each cell of the RAN. In this embodiment, the RAN may configure a TAI of a cell and a supported network slice together based on network slice configuration information, and therefore efficiency is comparatively high.

In one embodiment, before the RAN receives the network slice configuration information sent by the network management device, the RAN further receives tracking-area configuration information sent by the network management device, where the tracking-area configuration information is used to indicate the information about the at least one TAI configured for each cell of the RAN.

According to a fourth aspect, this application provides a network management device, where the device is configured to perform the method in the first aspect. In one embodiment, the device includes a module configured to perform the method in the first aspect.

According to a fifth aspect, this application provides a network management device, where the device is configured to perform the method in the second aspect. In one embodiment, the device includes a module configured to perform the method in the second aspect.

According to a sixth aspect, this application provides a RAN, where the device is configured to perform the method in third aspect. In one embodiment, the device includes a module configured to perform the method in the third aspect.

According to a seventh aspect, this application provides a communication apparatus. The device may be the first network management device in the first aspect, or may be a chip of the first network management device. The communications apparatus includes a processor, a memory, and a transceiver. The processor is coupled to the memory and the transceiver. The memory is configured to store computer executable program code. The computer executable program code includes an instruction. When the processor executes the instruction, the communication apparatus is enabled to perform the method in the first aspect.

According to an eighth aspect, this application provides a communication apparatus. The device may be the second network management device in the second aspect, or may be a chip of the second network management device. The communications apparatus includes a processor, a memory, and a transceiver. The processor is coupled to the memory and the transceiver. The memory is configured to store computer executable program code. The computer executable program code includes an instruction. When the processor executes the instruction, the communication apparatus is enabled to perform the method in the second aspect.

According to a ninth aspect, this application provides a communication apparatus. The device may be the RAN in the third aspect, or may be a chip of the RAN. The communications apparatus includes a processor, a memory, and a transceiver. The processor is coupled to the memory and the transceiver. The memory is configured to store computer executable program code. The computer executable program code includes an instruction. When the processor executes the instruction, the communication apparatus is enabled to perform the method in the third aspect.

According to a tenth aspect, this application provides a computer readable storage medium. The readable storage medium stores a computer instruction. When the instruction is run on a computer, the computer is enabled to perform the method in any one of the first aspect to the third aspect.

According to an eleventh aspect, this application provides a computer program product. The computer program product includes computer program code. When the computer program code is run on a computer, the computer is enabled to perform the method in any one of the first aspect to the third aspect.

According to a twelfth aspect, this application provides a chip, including a processor and a memory. The memory is configured to store a computer program. The processor is configured to invoke and run the computer program from the memory. The computer program is used to implement the methods in any one of the first aspect to the third aspect.

In this application, based on the embodiments provided in the foregoing aspects, the embodiments may be further combined to provide more embodiments.

DESCRIPTION OF EMBODIMENTS

Figure 1:
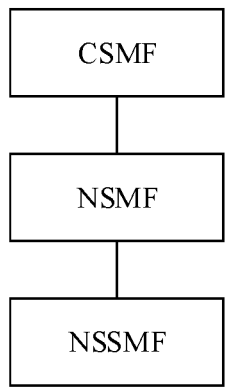
FIG. 1 is a schematic diagram of a network slice management system.

To make the objectives, technical solutions, and advantages of the embodiments of the present application clearer, the following further describes the embodiments of the present application in detail with reference to the accompanying drawings.

Embodiments of the present application provide a configuration method and a corresponding apparatus, to provide a mechanism for configuring, for a RAN, a network slice supported by the RAN. The configuration method and the apparatus (for example, a network management device and a RAN) are based on a same inventive concept. Because a problem resolution principle of the method and a problem resolution principle of the apparatus are similar, mutual reference may be made between implementation of the apparatus and implementation of the method, and repeated parts are not described again.

It should be understood that, "plurality" in the embodiments of the present application refers to two or more. In addition, in the description of the embodiments of the present application, terms such as "first" and "second" are only used for distinction and description, but should not be understood as indication or implication of relative importance, and should not be understood as an indication or implication of a sequence. The term "and/or" in the embodiments of the present application is only used to describe an association relationship between associated objects and represents that three relationships may exist. For example, A and/or B may represent the following three cases: Only A exists, both A and B exist, and only B exists.

The embodiments of the present application may be applicable to a 5th-generation mobile communications (5G) system, or may be applicable to another wireless communications system, such as a long term evolution (LTE) system, a global system for mobile communications (GSM) system, a mobile communications system (UMTS), a code division multiple access (CDMA) system, or a new network device system.

The following first describes some concepts related to the embodiments of the present application.

A network slice: is a logical network customized based on a service requirement and a physical or virtual network infrastructure. The network slice may be a complete end-to-end network that includes a terminal, an access network, a transport network, a core network, and an application server, can provide a complete telecommunications service, and has a network capability. Alternatively, the network slice may be any combination of a terminal, an access network, a transport network, a core network, and an application server. The network slice may have one or more of the following characteristics: An access network may be sliced or may not be sliced. The access network may be shared by a plurality of network slices. Characteristics of different network slices may be different from network functions of the different network slices.

Network slice instance (NSI): a really operating logical network, which can satisfy a network feature or service requirement. One network slice instance may provide one or more services. The network slice instance may be created by a network management system. One network management system may create and manage a plurality of network slice instances. The management includes performance monitoring, fault management, or the like in a process of operating the network slice instances. When a plurality of network slice instances coexist, the network slice instances may share some network resources and network functions. The network slice instance may be created from a network slice template, or may not be created from a network slice template. A complete network slice instance can provide a complete end-to-end network service, and a network slice instance may include a network slice subnet instance (NSSI) and/or a network function (NF). The network function may include a physical network function and/or a virtual network function. The physical network function and/or the virtual network function are/is collectively referred to as a network function below.

Network slice subnet instance (NSSI): The network slice subnet instance may not need to provide a complete end-to-end network service, and the network slice subnet instance may be a set of network functions of a same equipment vendor in a network slice instance, or may be a set of network functions divided by domain, for example, a core-network network slice subnet instance, an access-network network slice subnet instance, or a set formed based on a deployment location and in another other manner. A network slice subnet instance may be shared by a plurality of network slice instances. The proposed network slice subnet instance can facilitate management of a network management system. One network slice instance may include a plurality of network slice subnet instances, and each network slice subnet instance includes a plurality of network functions and/or a plurality of network slice subnet instances. One network slice instance may include a plurality of network slice subnet instances and network functions that are not grouped into network slice subnet instances. One network slice instance may alternatively include only a plurality of network functions.

Network function (NF): is a processing function in a network, and defines a functional behavior and interface. The network function may be implemented by using dedicated hardware, or may be implemented by running software on dedicated hardware, or may be implemented in a form of a virtual function on a common hardware platform. Therefore, from a perspective of implementation, network functions may be classified into a physical network function and a virtual network function. From a perspective of use, network functions may be classified into a dedicated network function and a shared network function. In one embodiment, a plurality of (sub) network slice instances may independently use different network functions, which are referred to as dedicated network functions; or may share a same network function, which is referred to as a shared network function.

Access network: includes one or more access network devices. The access network device may be a base station. The base station may be a base station (gNode B, gNB) in 5G communications, an evolved NodeB (evolutional eNode B) in evolved LTE, another device supporting a network slice, or the like.

Tracking area (TA): The TA is a concept set for location management of a UE, and is defined as a free moving area in which the UE does not need to update a service. To manage a terminal location, the TA function may be classified into paging management and location update management. The UE notifies a core network of a TA of the UE by using a location update message.

Tracking area identity (TAI): may include a tracking area code (TAC) and a public land mobile network (PLMN). Only one TAC but one or more PLMNs may be configured for one cell, a same TAC or different TACs may be configured for different cells belonging to a same base station, and a same PLMN or different PLMNs may be configured for different cells belonging to a same base station. Therefore, one or more TAIs may be configured for one cell, and different TAIs or a same TAI may be configured for different cells belonging to a same base station. A TAI list is allocated to the UE. When the UE moves in a TA in the TAI list, the UE does not need to send a location update message (except a periodic location update) to the core network. When the UE moves to a TA and the TA is not in the TAI list, the UE needs to send a location update message to the core network. When the UE is in an idle state, the core network can know that the UE is located in a TA in the TAI list. In addition, when the UE in the idle state needs to be paged, the UE needs to be paged in all cells in the TAI list corresponding to the UE.

Single network slice selection assistance information (S-NSSAI): is used to distinguish between different network slices (which does not mean that there is a one-to-one correspondence between S-NSSAI and network slice instances). SSTs have a plurality of standardized types, including an enhanced mobile broadband (EMBB) type, an ultra-reliable and low-latency communications (URLLC) type, and a massive Internet of things (MIoT) type that correspond to SST values 1, 2, and 3 respectively. The S-NSSAI includes a slice/service type SST (slice/service type). The S-NSSAI may further include a slice differentiator (SD). In the embodiments of the present application, a same TAI may support one or more pieces of S-NSSAI, and a plurality of pieces of S-NSSAI supported by the same TAI may be represented as S-NSSAIs.

Network slice management system: is a network slice management part in a communications network. Referring to FIG. 1, the network slice management system may include a communication service management function (CSMF) module, a network slice management function (NSMF) module, and a network slice subnet management function (NSSMF) module.

The CSMF module may be responsible for converting a communications service demand of an operator and/or a third-party client into a demand for a network (slice), sending, to the NSMF through an interface between the CSMF and the NSMF, the demand for the network slice (for example, creating, terminating, and modifying a network slice instance request), obtaining network slice management data (for example, performance and fault data) from the NSMF, generating management data of a communication service running on a network slice instance, and receiving a subscription demand of the operator and/or the third-party client for network slice management data and/or communication service management data, or the like.

The NSMF module may be responsible for receiving a demand for a network slice that is sent by the CSMF, managing a life cycle, performance, a fault, or the like of the network slice instance (management on the life cycle, the performance, and the fault is referred to as management for short below), orchestrating composition of the network slice instance, dividing a demand for the network slice instance into demands for network slice subnet instances and/or demands for network functions, and sending a network slice subnet instance management request to each NSSMF.

The NSSMF module may be responsible for receiving a network slice subnet demand sent by the NSMF, managing the network slice subnet instance, orchestrating composition of the network slice subnet instance, and dividing a demand for the network slice subnet instance into demands for network functions and/or nested network slice subnet instances, and may send a nested network slice subnet instance management request to another NSSMF.

The foregoing three modules are modules in the management system that are configured to manage a network slice. Locations of the three modules and whether the three modules exist independently are not limited in the embodiments of the present application.

Figure 2:
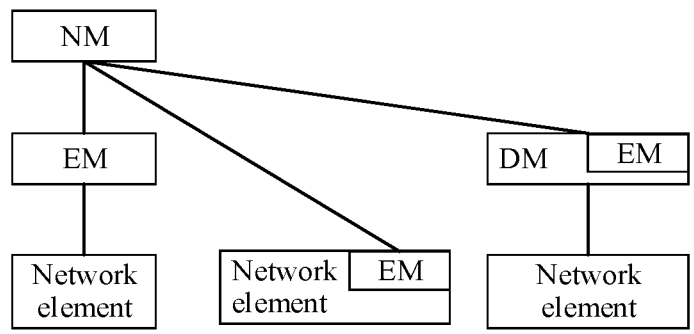
FIG. 2 is a schematic diagram of a network element management system.
Figure 3:
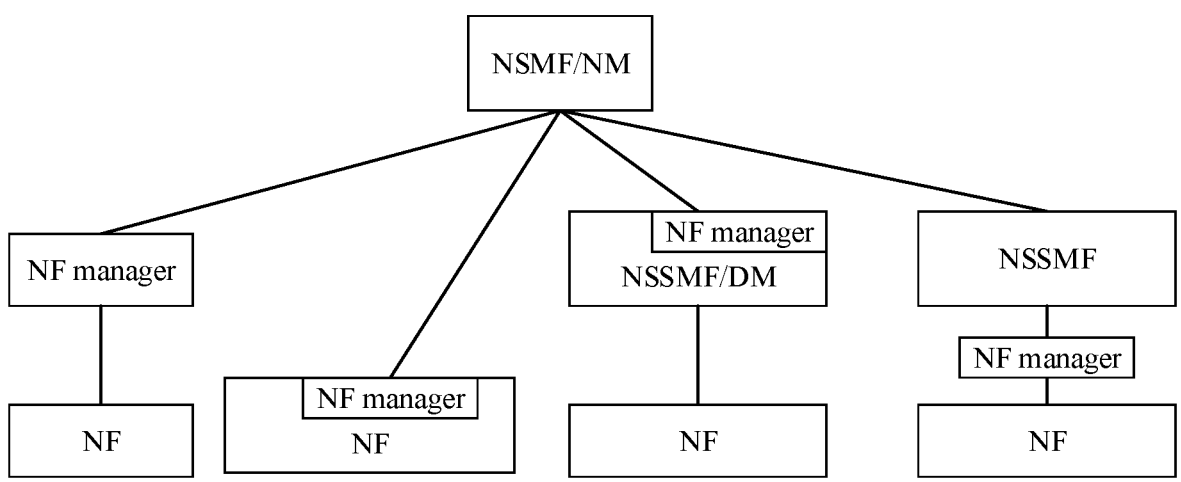
FIG. 3 is a schematic diagram of a network function management system.

The management system in the communications network may further include:

a network manager (NM), configured to manage the entire communications network and send an instruction to another module in the network management system;

an element manager (EM) that configures a network element, where referring to FIG. 2, the EM may be an independent device, or may be directly located on the network element, or may be integrated into a domain manager (DM); and a network function (NF) manager, configured to configure a network function, where referring to FIG. 3, the NF manager may be an independent device, or may be directly located on the NF, or may be integrated into a domain manager or the NSSMF module, or the NF manager is further managed by the NSSMF module.

Figure 4:
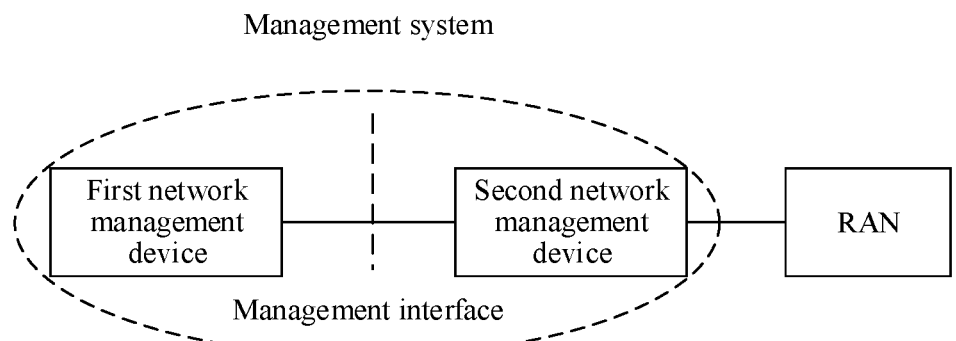
FIG. 4 is a schematic diagram of a communications system according to an embodiment of the present application.

FIG. 4 is a schematic diagram of a communications system according to an embodiment of the present application. A management system of a communications network includes a first network management device and a second network management device. The first network management device sends a RAN configuration message to the second network management device, and the second network management device configures the RAN.

The first network management device and the second network management device may be implemented in a plurality of manners, including but not limited to the following cases:

(1) The first network management device includes a network manager (NM) or a network slice management function (NSMF) module, and the second network management device includes an element manager (EM) or a network function (NF) manager.

(2) The first network management device includes an NSMF module, the second network management device includes an NSSMF module, an EM or an NF manager is integrated into the NSSMF module, and the EM or the NF manager integrated into the NSSMF module sends network slice configuration information to a RAN device. This can simplify an architecture of a network management system and reduce costs.

(3) The first network management device includes an NSSMF module, and the second network management device includes an EM or an NF manager.

(4) The first network management device includes an NM/NSMF module, and the second network management device includes a domain manager (DM).

It should be noted that, the NM is not limited to a conventional network manager for managing a 4th-generation mobile communications (4G) network or a network manager for managing a 5th-generation mobile communications (5G) network in the future. The EM is not limited to a conventional element manager for managing a 4G network device, or an element manager for managing a 5G network device in the future. The DM is responsible for managing a management domain in a 4G network. Whether a DM exists in a future 5G network or whether a function of the DM and a function of the NSSMF are integrated together is not limited.

Figure 5:
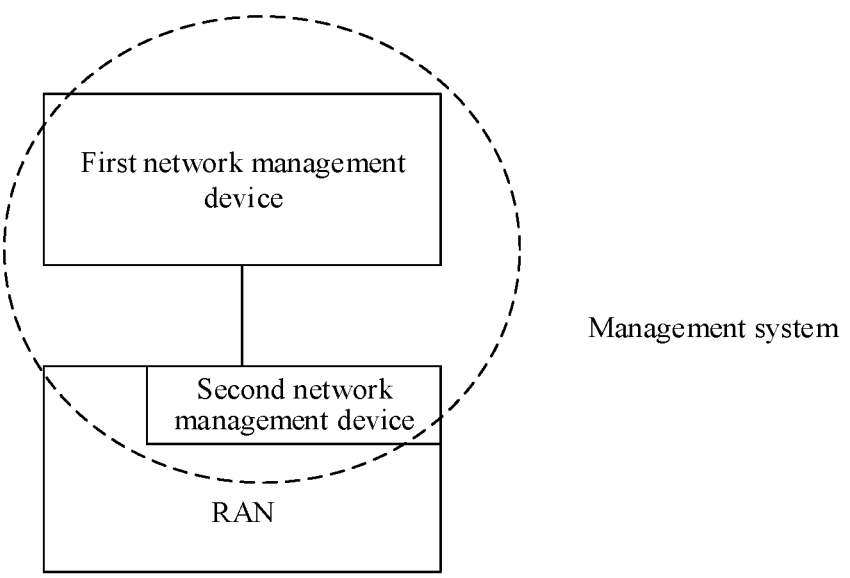
FIG. 5 is another schematic diagram of a communications system according to an embodiment of the present application.

In addition, the first network management device and the second network management device may be separately implemented by different physical devices, or may be integrated into a same physical device for implementation. Further, referring to FIG. 5, the second network management device may be further integrated into a RAN device. For example, when the second network management device is an EM or an NF manager, the second network management device may be integrated into the RAN device.

Figure 6:
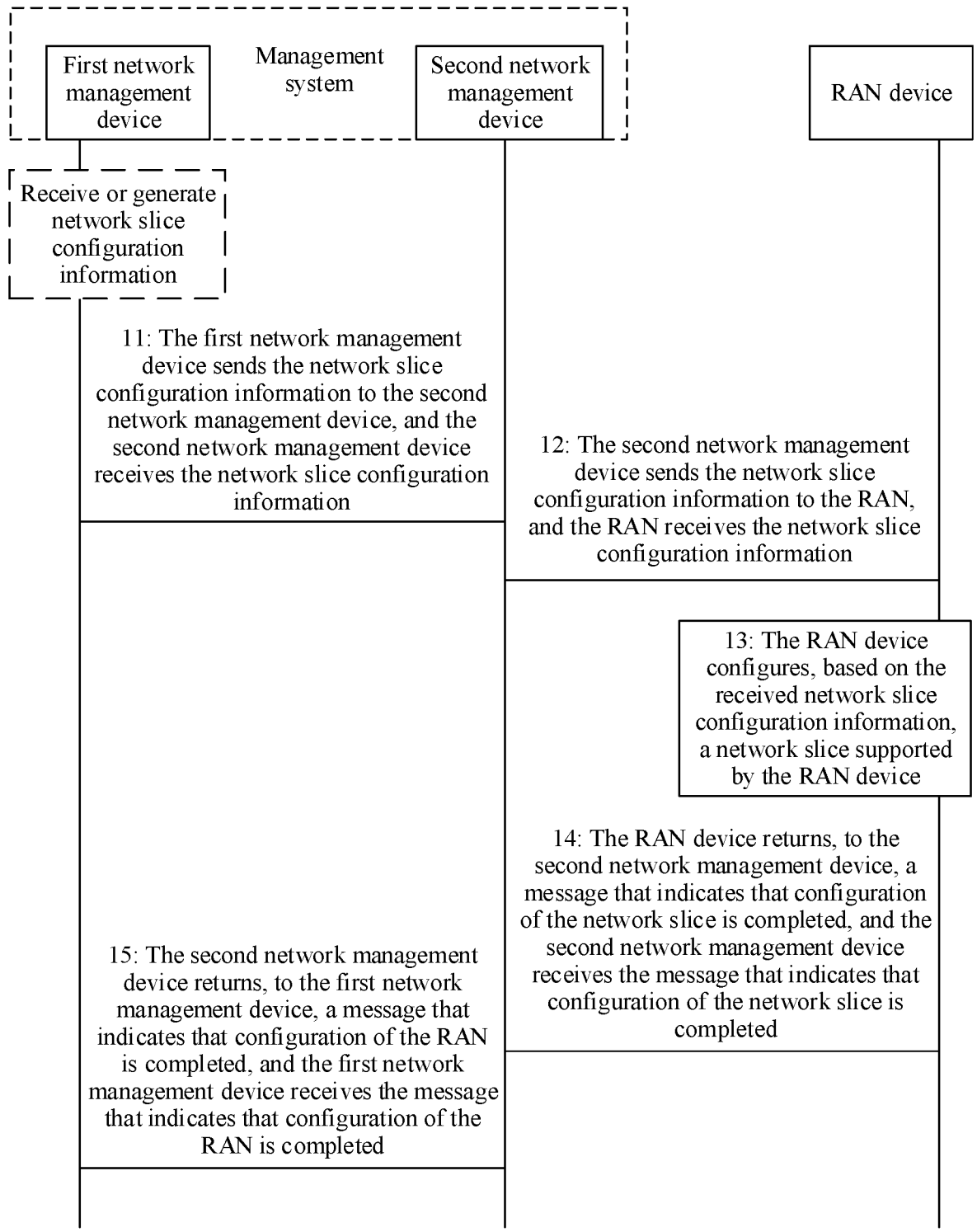
FIG. 6 and FIG. 7 are schematic flowcharts of a configuration method according to an embodiment of the present application.

FIG. 6 is a schematic flowchart of a configuration method according to an embodiment of the present application. The method includes the following operations:

Operation 11: A first network management device sends network slice configuration information to a second network management device, and the second network management device receives the network slice configuration information. The network slice configuration information includes information that indicates a network slice supported by a RAN. In this embodiment of the present application, the first network management device may send network slice configuration information of one RAN device to the second network management device, or may send network slice configuration information of a plurality of RAN devices together to the second network management device.

Operation 12: The second network management device sends the network slice configuration information to the RAN, and the RAN receives the network slice configuration information. If the first network management device sends network slice configuration information of a plurality of RAN devices to the second network management device, the second network management device sends network slice configuration information of each RAN device to the RAN device.

Operation 13: The RAN device configures, based on the received network slice configuration information, the network slice supported by the RAN device. For example, after receiving the network slice configuration information, the RAN device may create a list, where information about the network slice supported by the RAN device is stored in the list. In some embodiments, before receiving the network slice configuration information, the RAN device has already stored the list; in this case, the RAN device may update the list based on the network slice configuration information.

Operation 14: The RAN device returns, to the second network management device, a message that indicates that configuration of the network slice is completed, and the second network management device receives the message that indicates that configuration of the network slice is completed.

Operation 15: The second network management device returns, to the first network management device, a message that indicates that configuration of the RAN is completed, and the first network management device receives the message that indicates that configuration of the RAN is completed. In an embodiment in which the first network management device sends network slice configuration information of a plurality of RAN devices to the second network management device together, there may be two embodiments for operation 15. In one embodiment, after receiving a network slice configuration completion message returned by each RAN device, the second network management device returns, to the first network management device, a message that indicates that configuration of the RAN device is completed. In the other embodiment, the second network management device returns, to the first network management device only after receiving network slice configuration completion messages returned by all RAN devices, a message that indicates that configuration of all RAN devices is completed.

It should be noted that, operations 14 to 15 are described for completeness of the solution, but are not required operations for implementing this embodiment of the present application. For example, after sending network slice configuration information to the RAN device, the second network management device may return, to the first network management device, a message that indicates that configuration of the RAN is completed, with no need to wait for the RAN device to return a message that indicates that configuration of the network slice is completed, or to return, to the first network management device only after the second network management device receives the message that indicates that configuration of the RAN is completed, the message that indicates configuration of the RAN is completed. For another example, the RAN device may not send, to the second network management device after completing configuration of the network slice, the message that indicates that configuration of the network slice is completed, but send, to the second network management device only after configuration of the network slice fails, a message that indicates that configuration of the network slice fails. For another example, the second network management device may not return, to the first network management device after completing configuration of the RAN, a message that indicates that configuration of the RAN is completed, but return, to the first network management device only after failing to configure the RAN, a message that indicates that configuration of the RAN fails.

In the foregoing technical solution, the first network management device is responsible for forming network slice configuration information for configuring a network slice of a RAN device, but may not directly deliver the network slice configuration information to the RAN device. Instead, the first network management device sends network slice configuration information of one or more RAN devices to the second network management device, and the second network management device is responsible for delivering, to the RAN devices, the network slice configuration information corresponding to the RAN devices. In this way, the network slices supported by the RAN devices can be configured. In addition, the first network management device and the second network management device have clear responsibilities: The first network device mainly undertakes higher-level management functions, for example, a network management function and a network slice instance management function; and the second network device mainly undertakes specific and lower-level management functions, for example, management on a network slice subnet instance, a network device, and a network function. Therefore, management levels are clear, load of the first network device and load of the second network device are not excessively heavy, so that a system for configuring a network slice can efficiently operate.

There may be possibilities for a source of the network slice configuration information sent by the first network management device in operation 11. The possibilities include but are not limited to the following:

First, the first network management device generates the network slice configuration information. For example, when a network slice is created, the first network management device generates the network slice configuration information. For another example, when the network slice operates, the first network management device generates the network slice configuration information when changing a network slice supported by the RAN device.

Second, the first network management device receives the network slice configuration information from another network management device. For example, the NSMF and the NM are not integrated together for implementation, but are separately implemented. There is an interface between the NSMF and the NM. The NSMF may provide slice information for the NM, and the slice information may include one or more of the following: S-NSSAIs corresponding to a network slice instance, RAN network slice subnet instance information included in the network slice instance, and a geographical range covered by the network slice instance. In this case, the NM can generate network slice configuration information, and the NM further delivers network slice configuration information to the second network management device. In the foregoing example, the NM is the first network management device, and the NSMF is the another network management device.

In the foregoing technical solution, the manner in which the first network management device obtains the network slice configuration information is flexible, which helps achieve or improve efficiency of configuring the network slice of the RAN device.

The information that indicates the network slice supported by the RAN device and that is included in the network slice configuration information may indicate information about a network slice supported by each TAI configured for each cell of the RAN device, and the network slice supported by each TAI of each cell may be configured based on the network slice configuration information.

The information that indicates the network slice supported by the RAN device and that is included in the network slice configuration information may be information that indicates a network slice supported by each TAI configured for the RAN device, supported network slices may be configured, based on the network slice configuration information, for all TAIs configured for the RAN device, and the configuration is performed only once for each TAI. This avoids repeatedly indicating, for a same TAI of different cells, a network slice supported by the TAI, reduces a data volume of the network slice configuration information, reduces a time consumed in transmission of the network slice configuration information and consumption of transmission resources, and improves configuration efficiency.

The information about the network slice may be S-NSSAI, that is, the network slice configuration information includes S-NSSAIs supported by each TAI configured for each cell of the RAN device, or the network slice configuration information includes S-NSSAIs supported by each TAI configured for the RAN device. In this embodiment of the present application, the following content is described by using an example in which the information about the network slice is S-NSSAI.

In this embodiment of the present application, there may be a plurality of implementations for a form of the network slice configuration information. Based on different implementations of the network slice configuration information, there may also be different implementations for a configuration process of the RAN device. The following describes some implementations.

In Implementation 1, the network slice configuration information includes information that indicates at least one TAI configured for each cell of the RAN device and S-NSSAI supported by each TAI configured for each cell of the RAN device. Table 1 is a possible example of the network slice configuration information.

TABLE 1

| RAN device | Cell | TAC | TAI | Network slice supported by a TAI of a cell |
|---|---|---|---|---|
| gNB_x | Cell_1 | TAC_1 | PLMN 1 | S-NSSAIs 1, 2, and 3 |
|  |  |  | PLMN 2 | S-NSSAIs 2, 3, and 4 |
|  | Cell_2 | TAC_1 | PLMN 1 | S-NSSAIs 1, 2, and 3 |
|  | Cell_3 | TAC_2 | PLMN 1 | S-NSSAIs 4 and 5 |

In the table, gNB_x is used to indicate a RAN device. For example, gNB_x is an identifier of a base station, one RAN device may include one or more cells, and one TAC and one or more PLMNs are configured for one cell. Because one TAI includes one TAC and one PLMN, one or more TAIs may be configured for one cell and a quantity of TAIs of one cell depends on a quantity of PLMNs of the cell. Different TAIs of one cell may support different S-NSSAIs, and a same TAI of different cells supports same S-NSSAIs. For example, in Table 1, a TAC, which is TAC_1, is allocated to Cell_1, but two PLMNs, which are a PLMN 1 and a PLMN 2, are allocated Cell_1. That is, two TAIs, which are TAI=(TAC_1+PLMN 1) and TAI=(TAC_1+PLMN 2), are allocated to Cell_1. S-NSSAIs supported by the two TAIs are different: S-NSSAI supported by TAI=(TAC_1+PLMN 1) includes S-NSSAIs 1 to 3, S-NSSAI supported by TAI=(TAC_1+PLMN 2) includes S-NSSAIs 2 to 4; and TAI=(TAC_1+PLMN 1) is also allocated to Cell_2, and the TAI=(TAC_1+PLMN 1) allocated to Cell_2 is the same as the S-NSSAI supported by TAI=(TAC_1+PLMN 1) allocated to Cell_1.

In implementation 1, a TAI of each cell of the RAN device may be configured for the RAN device, and S-NSSAIs supported by each TAI of each cell are configured together, so that efficiency is comparatively high.

In implementation 2, the network slice configuration information includes information that indicates at least one TAI configured for each cell of the RAN device and S-NSSAI supported by each TAI configured for the RAN device. Table 2 is a possible example of the network slice configuration information.

TABLE 2

| RAN device | Network slice supported by a TAI | Cell | TAI | |
|---|---|---|---|---|
| gNB_x | TAI = (TAC_1 + PLMN 1) → S-NSSAIs 1, 2, and 3 | Cell_1 | TAC_1 | PLMN 1 |
|  |  |  |  | PLMN 2 |
|  | TAI = (TAC_1 + PLMN 2) → S-NSSAIs 2, 3, and 4 | Cell_2 | TAC_1 | PLMN 1 |
|  | TAI = (TAC_2 + PLMN 1) → S-NSSAIs 4 and 5 | Cell_3 | TAC_2 | PLMN 1 |

A difference between implementation 2 and implementation 1 lies in that a network slice supported by a TAI is configured based on a TAI of a RAN device instead of on a TAI of a cell. In different cells of a RAN device, information about network slices supported by a same TAI is the same. In other words, the network slice configuration information is used to indicate S-NSSAI supported by each TAI of the RAN device, without paying attention to a cell whose TAI supports the S-NSSAI. In the technical solution of implementation 2, a case in which the S-NSSAI is configured for a same TAI for a plurality of times (for example, in Table 1, the S-NSSAI is configured for TAI=(TAC_1+PLMN 1) twice) can be avoided, reducing a data volume of the network slice configuration information, reducing a time consumed in transmission of the network slice configuration information and consumption of transmission resources, and improving configuration efficiency.

In implementation 3, the network slice configuration information does not include the information that indicates the at least one TAI configured for each cell of the RAN device. The network management system may first send tracking-area configuration information to the RAN device, where the tracking-area configuration information includes information that indicates at least one TAI configured for each cell of the RAN device, to configure the TAI of the cell of the RAN device and then send the network slice configuration information to the RAN device.

Table 3 is a possible example of the tracking-area configuration information.

TABLE 3

| RAN device | Cell | TAI | |
|---|---|---|---|
| gNB_x | Cell_1 | TAC_1 | PLMN 1 |
| | | | PLMN 2 |
| | Cell_2 | TAC_1 | PLMN 1 |
| | Cell_3 | TAC_2 | PLMN 1 |

Table 4 is a possible example of the network slice configuration information. The network slice configuration information includes mapping between each TAI of the RAN and S-NSSAIs supported by the TAI.

TABLE 4

| RAN device | TAI | Network slice supported by a TAI |
|---|---|---|
| gNB_x | TAI = (TAC_1 + PLMN 1) | S-NSSAIs 1, 2, and 3 |
| | TAI = (TAC_1 + PLMN 2) | S-NSSAIs 2, 3, and 4 |
| | TAI = (TAC_2 + PLMN 1) | S-NSSAIs 4 and 5 |

Table 5 shows another possible example of the network slice configuration information, where the network slice configuration information includes mapping between each TAI of each cell of the RAN and S-NSSAIs supported by the TAI. Table 4 and Table 5 include a TAI configured for each cell. However, different from that in Table 1 and Table 2 in implementation 1, in the network slice configuration information in Table 4 and Table 5, a TAI of each cell is not configured, but only S-NSSAIs corresponding to each TAI supported by the cell are configured; and the TAIs supported by the cell are configured in Table 3.

TABLE 5

| RAN device | Cell | TAI | Network slice supported by a TAI of a cell |
|---|---|---|---|
| gNB_x | Cell_1 | TAI = (TAC_1 + PLMN 1) | S-NSSAIs 1, 2, and 3 |
| | | TAI = (TAC_1 + PLMN 1) | S-NSSAIs 2, 3, and 4 |

TABLE 5-continued

| RAN device | Cell | TAI | Network slice supported by a TAI of a cell |
|---|---|---|---|
| | Cell_2 | TAI = (TAC_1 + PLMN 1) | S-NSSAIs 1, 2, and 3 |
| | Cell_3 | TAI = (TAC_2 + PLMN 1) | S-NSSAIs 4 and 5 |

A variant solution of Table 5 is that the network slice configuration information includes mapping between each PLMN of each cell of the RAN and S-NSSAIs supported by the PLMN. This is because, for each cell, PLMNs of the cell are in a one-to-one correspondence with TAIs of the cell. This variant solution can reduce a data volume of the network slice configuration information and reduce consumption of resources during RAN configuration.

It should be noted that, in implementation 3, a mechanism similar to that for the foregoing network slice configuration process may be used for a configuration process of a tracking area of each cell of the RAN. That is, a third network management device sends tracking-area configuration information to a fourth network management device, and the fourth network management device delivers the tracking-area configuration information to the RAN device. The third network management device and the first network management device may be a same device, and the fourth network management device and the second network management device may be a same device. That is, the first network management device may send the tracking-area configuration information to the second network management device, and may also send the network slice configuration information to the second network management device; and the second network management device may send the tracking-area configuration information to the RAN device, and may also send the network slice configuration information to the RAN device. In another possible implementation, in a tracking-area configuration solution, the third network management device is different from the first network management device, and/or the fourth network management device is different from the second network management device. For example, the first network management device is an NSMF module, and the second network management device is an NSSMF module into which an EM or an NF manager is integrated. In the tracking-area configuration solution, the third network management device is an NM, and the fourth network management device is an NF manager.

In implementation 4, with reference to implementation 1, implementation 2, or implementation 3, the network slice configuration information further includes information that indicates a usable frequency corresponding to S-NSSAI, and the RAN device may further configure, based on the network slice configuration information, a frequency supported by S-NSSAI, to improve RAN configuration efficiency.

Table 6 is a possible example of the network slice configuration information with reference to implementation 1. The network slice configuration information includes a TAI of each cell of the RAN device, S-NSSAIs supported by each TAI of each cell, and information about a usable frequency band for each S-NSSAI supported by each TAI for each cell.

TABLE 6

| RAN device | Cell | TAI | | Network slice supported by a TAI of a cell | Usable frequency of the network slice |
|---|---|---|---|---|---|
| gNB_x | Cell_1 | TAC_1 | PLMN 1 | S-NSSAIs 1, 2, and 3 | S-NSSAI 1→frequency band 1; S-NSSAIs 2 and 3→frequency bands 1 to 5 |
| | | | PLMN 2 | S-NSSAIs 2, 3, and 4 | S-NSSAIs 2 and 3→frequency bands 1 to 5; S-NSSAI 4→frequency bands 2 to 4 |
| | Cell_2 | TAC_1 | PLMN 1 | S-NSSAIs 1, 2, and 3 | S-NSSAI 1→frequency band 1; S-NSSAIs 2 and 3→frequency bands 1 to 5 |
| | Cell_3 | TAC_2 | PLMN 1 | S-NSSAIs 4 and 5 | S-NSSAIs 4 and 5→frequency bands 2 to 4 |

Table 7 is another possible example of the network slice configuration information with reference to implementation 1. A difference from the network slice configuration information in Table 6 lies in that a frequency supported by each S-NSSAI is configured only once for the S-NSSAI supported by the RAN device, to reduce a data volume of the network slice configuration information and reduce consumption of resources during network slice configuration.

TABLE 7

| RAN device | Usable frequency of a network slice | Cell | TAI | | Network slice supported by a TAI of a cell |
|---|---|---|---|---|---|
| gNB_x | S-NSSAI 1→frequency band 1 | Cell_1 | TAC_1 | PLMN 1 | S-NSSAIs 1, 2, and 3 |
| | | | | PLMN 2 | S-NSSAIs 2, 3, and 4 |
| | S-NSSAIs 2 and 3→frequency bands 1 to 5 | Cell_2 | TAC_1 | PLMN 1 | S-NSSAIs 1, 2, and 3 |
| | S-NSSAI 4s and 5→frequency bands 2 to 4 | Cell_3 | TAC_2 | PLMN 1 | S-NSSAIs 4 and 5 |

Table 8 is a possible example of the network slice configuration information with reference to implementation 2. The network slice configuration information includes S-NSSAIs supported by each TAI of the RAN device, information about a usable frequency band of each S-NSSAI and a TAI of each cell of the RAN device.

TABLE 8

| RAN device | Network slice supported by a TAI | Usable frequency of a network slice | Cell | TAI | |
|---|---|---|---|---|---|
| gNB_x | TAI = (TAC_1 + PLMN 1) → S-NSSAI 1, 2, and 3 | S-NSSAI 1→frequency band 1 | Cell_1 | TAC_1 | PLMN 1 |
| | | | | | PLMN 2 |
| | TAI = (TAC_1 + PLMN 2) → S-NSSAIs 2, 3, and 4 | S-NSSAIs 2 and 3→frequency bands 1 to 5 | Cell_2 | TAC_1 | PLMN 1 |
| | TAI = (TAC_2 + PLMN 1) → S-NSSAIs 4 and 5 | S-NSSAIs 4 and 5→frequency bands 2 to 4 | Cell_3 | TAC_2 | PLMN 1 |

With reference to implementation 3, the network slice configuration information includes mapping between each TAI of the RAN and S-NSSAIs supported by the TAI (referring to Table 4 or Table 5) and mapping between each S-NSSAI and a usable frequency of the S-NSSAI. Table 9 is a possible example of mapping between the S-NSSAI and a usable frequency of the S-NSSAI. In addition to being a frequency band identifier, the frequency band information may be a frequency range, or a parameter indicating a frequency feature, for example, a parameter indicating a high frequency or a low frequency. A form of the frequency information is not limited in the present application.

TABLE 9

| Slice information | Frequency information |
| --- | --- |
| S-NSSAI 1 | Frequency band 1 |
| S-NSSAIs 2 and 3 | Frequency bands 1 to 5 |
| S-NSSAIs 4 and 5 | Frequency bands 2 to 4 |

In another possible implementation with reference to implementation 3, the network slice configuration information may be used to configure a usable frequency of each network slice supported by each TAI of each cell of the RAN device. Table 10 is an example of the network slice configuration information in this possible implementation. Table 10 includes a TAI configured for each cell. However, in the network slice configuration information in Table 10, the TAI of each cell is not configured. Instead, but a network slice supported by the TAI configured for the cell and a usable frequency of the network slice supported by the TAI of the cell are configured. In one embodiment, S-NSSAIs corresponding to the TAI and a frequency that can be used by the S-NSSAI are configured.

TABLE 10

| RAN device | Cell | TAI | Network slice supported by a TAI of a cell | Usable frequency of the network slice |
| --- | --- | --- | --- | --- |
| gNB_x | Cell_1 | TAI = (TAC_1 + PLMN 1) | S-NSSAIs 1, 2, and 3 | S-NSSAI 1→frequency band 1; S-NSSAIs 2 and 3→frequency bands 1 to 5 |
| | | TAI = (TAC_1 + PLMN 1) | S-NSSAIs 2, 3, and 4 | S-NSSAIs 2 and 3→frequency bands 1 to 5; S-NSSAI 4→frequency bands 2 to 4 |
| | Cell_2 | TAI = (TAC_1 + PLMN 1) | S-NSSAIs 1, 2, and 3 | S-NSSAI 1→frequency band 1; S-NSSAIs 2 and 3→frequency bands 1 to 5 |
| | Cell_3 | TAI = (TAC_2 + PLMN 1) | S-NSSAIs 4 and 5 | S-NSSAIs 4 and 5→frequency bands 2 to 4 |

In the technical solution of implementation 4, the network management system may configure, for the RAN device, S-NSSAIs supported by a TAI and a usable frequency band corresponding to each S-NSSAI together, so that efficiency is comparatively high.

In implementation 5, with reference to implementation 1, implementation 2, or implementation 3, the network slice configuration information does not include the information that indicates a usable frequency corresponding to the S-NSSAI in implementation 3. However, after the network management system sends the network slice configuration information to the RAN device, the network management system may send spectrum configuration information to the RAN device. The spectrum configuration information includes information that indicates a usable frequency corresponding to the S-NSSAI. For implementation of the spectrum configuration information, refer to Table 9.

Figure 7:
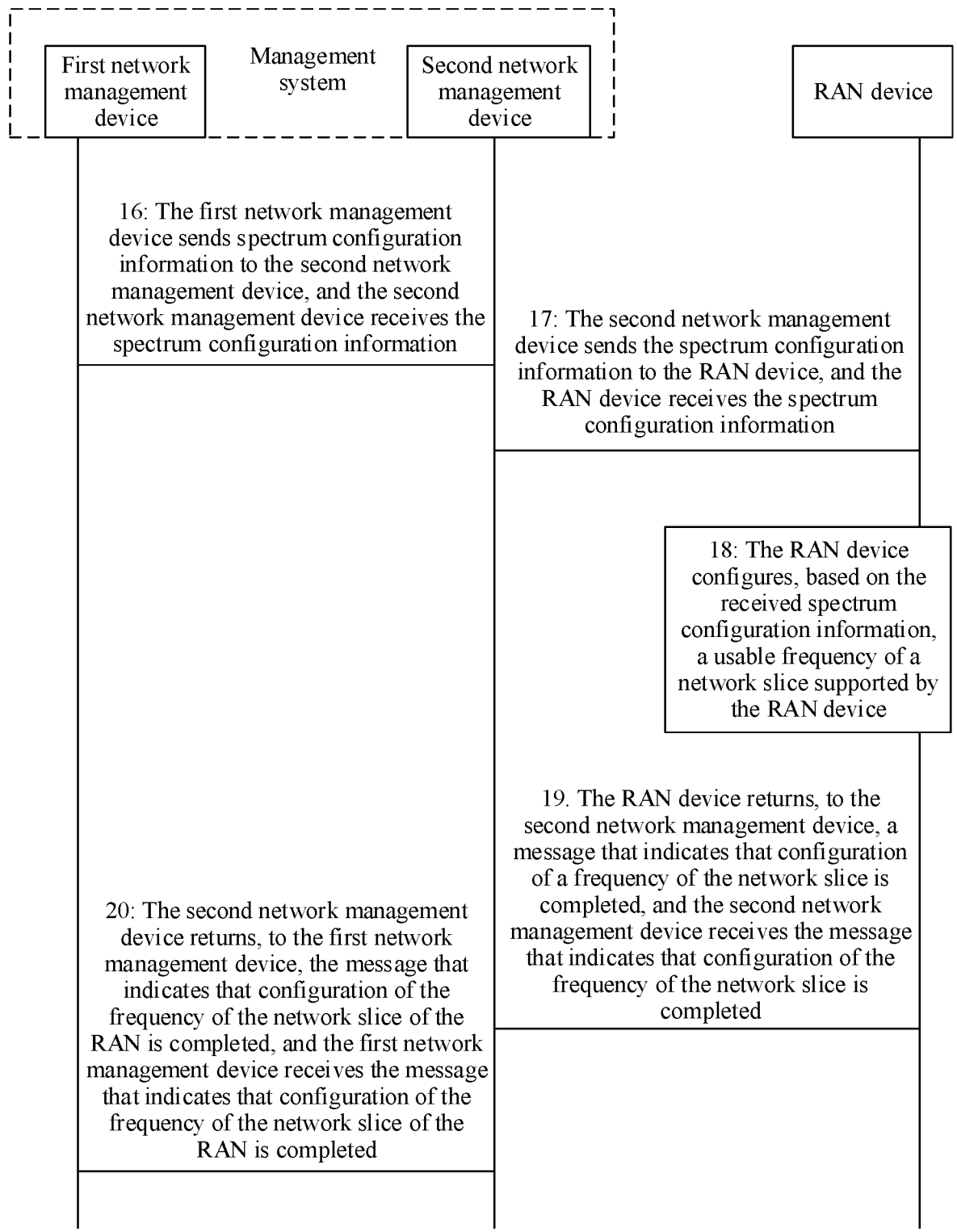

FIG. 7 is a schematic flowchart of configuring a usable frequency of a network slice of a RAN in implementation 5. The following operations are included:

Operation 16: The first network management device sends the spectrum configuration information to the second network management device, and the second network management device receives the spectrum configuration information. Operation 17: The second network management device sends the spectrum configuration information to a RAN device, and the RAN device receives the spectrum configuration information.

Operation 18: The RAN device configures, based on the received spectrum configuration information, a usable frequency of a network slice supported by the RAN device.

Operation 19: The RAN device returns, to the second network management device, a message that indicates that configuration of the frequency of the network slice is completed, and the second network management device receives the message that indicates that configuration of the frequency of the network slice is completed.

Operation 20: The second network management device returns, to the first network management device, the message that indicates that configuration of the frequency of the network slice of the RAN is completed, and the first network management device receives the message that indicates that configuration of the frequency of the network slice of the RAN is completed.

In this embodiment of the present application, operation 16 may be performed after any one of operations 11 to 15. For example, operation 16 is performed after operation 15; or operation 11 may be performed after any one of operations 16 to 20; or there is no sequence limitation between the process of operations 11 to 15 and the process of operations 16 to 20.

In the solution of operations 16 to 20, the first network management device and the second network management device configure a usable frequency of the network slice of the RAN device. However, in this embodiment of the present application, this is no limitation that the usable frequency of the network slice of the RAN device need to be configured by the first network management device and the second network management device. For example, when the first network management device is an NSMF module and the second network management device is an NF manager, the NSMF module sends the network slice configuration information to the NF manager, and the NF manager delivers the network slice configuration information to the RAN device. When the usable frequency of the network slice supported by the RAN device is configured, the NM module may send the spectrum configuration information to the NF manager, and the NF manager delivers the spectrum configuration information to the RAN device.

In the solution of implementation 5, only a usable frequency of a network slice may be configured. The configuration manner is flexibly implemented, and facilitates adjustment of available frequencies corresponding to some or all S-NSSAIs of the RAN device.

It should be noted that, Table 1 to Table 10 are examples of possible implementations of the foregoing configuration information, and the foregoing configuration information may be organized in a form different from those in the foregoing tables. An organization form of the foregoing configuration information is not limited in this embodiment of the present application. In addition, in the foregoing embodiments and tables, the network slice configuration information may include S-NSSAIs supported by each TAI in a TAI list supported by a base station or a cell, information about a frequency supported by each S-NSSAI (optional), and each TAI of each cell (optional). Context excluding the foregoing context is not content that are mandatorily included in the network slice configuration information, for example, a cell identifier or a base station identifier.

Figure 8:
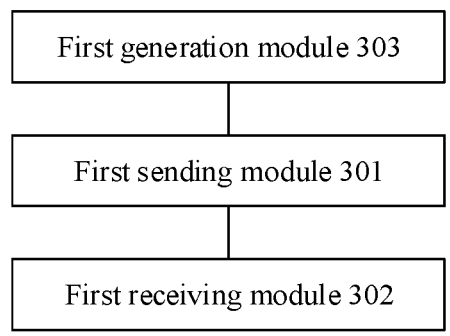
FIG. 8 to FIG. 10 are schematic diagrams of a network management device according to an embodiment of the present application.

FIG. 8 shows a network management device according to an embodiment of the present application. The network management device may be used as the first network management device in the configuration method according to the foregoing embodiment of the present application. The network management device includes:

a first sending module 301, configured to send network slice configuration information to a second network management device, where the network slice configuration information includes information that indicates a network slice supported by an access network RAN, and the second network management device has a function of configuring the RAN; and a first receiving module 302, configured to receive a message that is returned by the second network management device and that indicates that configuration of the RAN is completed.

In this embodiment of the present application, the information that indicates the network slice supported by the RAN includes:

information that indicates a network slice supported by each tracking area identity TAI configured for the RAN; or information that indicates a network slice supported by each TAI configured for each cell of the RAN.

In this embodiment of the present application, the information about the network slice includes S-NSSAI.

In this embodiment of the present application, the network slice configuration information further includes information that indicates a usable frequency of the network slice supported by the RAN.

In this embodiment of the present application, the first sending module 301 is further configured to send spectrum configuration information to the second network management device after sending the network slice configuration information to the second network management device, where the spectrum configuration information is used to indicate a usable frequency of the network slice supported by the RAN.

In this embodiment of the present application, the network slice configuration information further includes information that indicates at least one TAI configured for each cell of the RAN.

In this embodiment of the present application, the first sending module 301 is further configured to: send tracking-area configuration information to the second network management device before sending the network slice the configuration information to the second network management device, where the tracking-area configuration information is used to indicate the information about the at least one TAI configured for each cell of the RAN.

In this embodiment of the present application, the network management device is a network manager (NM) or a network slice management function (NSMF) module, and the second network management device is an element manager (EM) or a network function (NF) manager; or the network management device is an NSMF module, the second network management device is a network slice subnet management function NSSMF module, and the EM or the NF manager is integrated into the NSSMF module; or the network management device is an NSSMF module, and the second network management device is an EM or an NF manager.

In this embodiment of the present application, the first receiving module 302 is further configured to receive the network slice configuration information before the first sending module 301 sends the network slice configuration information to the second network management device.

In this embodiment of the present application, the network management device further includes:

a first generation module 303, configured to generate the network slice configuration information before the first sending module 301 sends the network slice configuration information to the second network management device.

In this embodiment of the present application, division into the modules is an example and is merely logical function division, and may be other division during actual implementation. In addition, functional modules in the embodiments of the present application may be integrated into one processor, or each of the modules may exist alone physically, or at least two modules may be integrated into one module. The integrated module may be implemented in a form of hardware, or may be implemented in a form of a software functional module.

Figure 9:
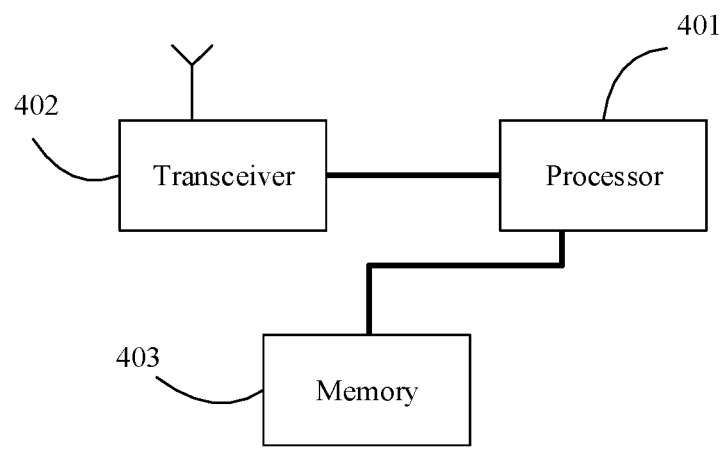

When the integrated module is implemented in a form of hardware, as shown in FIG. 9, the network management device may include a processor 401. Hardware of an entity corresponding to the first generation module may be the processor 401. The processor 401 may be a central processing module (CPU), a digital processing module, or the like. The network management device may further include a transceiver 402. By using the transceiver 402, the processor 401 sends the network slice configuration information to the second network management device, and receives a message that is returned by the second network management device and that indicates that configuration of the RAN is completed. The network management device further includes a memory 403, configured to store a program executed by the processor 401. The memory 403 may be a nonvolatile memory, for example, a hard disk drive (HDD) or a solid-state drive (SSD); or may be a volatile memory, for example, a random-access memory (RAM). The memory 403 is any other medium that can be configured to carry or store expected program code in a form of an instruction or a data structure and that is accessible by a computer, but no limitation is set thereto.

For implementations of the modules of the network management device, refer to the implementation of the operations performed by the first network management device in the foregoing configuration method.

Figure 10:
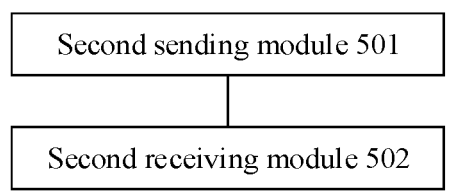

FIG. 10 shows another network management device according to an embodiment of the present application. The network management device may be used as the second network management device in the foregoing configuration method according to the embodiment of the present application. The network management device includes:

a second sending module 501, configured to send network slice configuration information to the RAN, where the network slice configuration information includes information that indicates a network slice supported by the RAN; and a second receiving module 502, configured to receive a message that is returned by the RAN and that indicates that configuration of the network slice is completed.

In this embodiment of the present application, the information that indicates the network slice supported by the RAN includes:

information that indicates a network slice supported by each tracking area identity TAI configured for the RAN; or information that indicates a network slice supported by each TAI configured for each cell of the RAN.

In this embodiment of the present application, the information about the network slice includes S-NSSAI.

In this embodiment of the present application, the network slice configuration information further includes information that indicates a usable frequency of the network slice supported by the RAN.

In this embodiment of the present application, the second sending module 501 is further configured to send spectrum configuration information to the RAN after sending the network slice configuration information to the RAN, where the spectrum configuration information is used to indicate a usable frequency of the network slice supported by the RAN.

In this embodiment of the present application, the network slice configuration information further includes information that indicates at least one TAI configured for each cell of the RAN.

In this embodiment of the present application, the second sending module 501 is further configured to: send tracking-area configuration information to the RAN before sending the network slice configuration information to the RAN, where the tracking-area configuration information is used to indicate the information about the at least one TAI configured for each cell of the RAN.

In this embodiment of the present application, the second receiving module 502 is further configured to: receive, before the second sending module 501 sends the network slice configuration information to the RAN, the network slice configuration information sent by a first network management device.

In this embodiment of the present application, the second sending module 501 is further configured to:

send, to the first network management device after the second receiving module 502 receives the message that is returned by the RAN and that indicates that configuration of the network slice is completed, a message that indicates that configuration of the RAN is completed.

In this embodiment of the present application, the network management device is a network manager (NM) or a network slice management function (NSMF) module, and the second network management device is an element manager (EM) or a network function (NF) manager; or the network management device is an NSMF module, the second network management device is a network slice subnet management function (NSSMF) module, and the EM or the NF manager is integrated into the NSSMF module; or the network management device is an NSSMF module, and the second network management device is an EM or an NF manager.

In this embodiment of the present application, division into the modules is an example and is merely logical function division, and may be other division during actual implementation. In addition, functional modules in the embodiments of the present application may be integrated into one processor, or each of the modules may exist alone physically, or at least two modules may be integrated into one module. The integrated module may be implemented in a form of hardware, or may be implemented in a form of a software functional module.

When the integrated module is implemented in a form of hardware, the network management device may include a transceiver (still referring to FIG. 9), and a hardware entity corresponding to each of the second receiving module and the second sending module may be the transceiver. The network management device may further include a processor. The processor may be a central processing module, a digital processing module, or the like, and is configured to instruct the transceiver to send the network slice configuration information, receive the message that indicates that configuration of the network slice is completed, or the like. The network management device further includes a memory, configured to store a program executed by the processor. The memory may be a nonvolatile memory such as a hard disk drive or a solid-state drive, or may be a volatile memory such as a random access memory. The memory is any other medium that can be configured to carry or store expected program code in a form of an instruction or a data structure and that is accessible by a computer, but no limitation is set thereto.

For implementations of the modules of the network management device, refer to the implementation of the operations performed by the second network management device in the foregoing configuration method.

Figure 11:
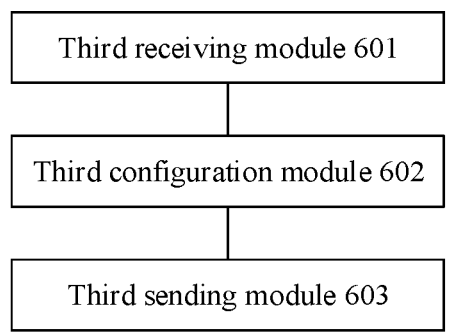
FIG. 11 is a schematic diagram of a RAN according to an embodiment of the present application.

FIG. 11 shows a RAN according to an embodiment of the present application. The RAN may be used as the RAN device in the foregoing configuration method according to the foregoing embodiment of the present application. The RAN includes:

a third receiving module 601, configured to receive network slice configuration information sent by a network management device, where the network slice configuration information includes information that indicates a network slice supported by the RAN;

a third configuration module 602, configured to configure the supported network slice based on the network slice configuration information; and a third sending module 603, configured to return, to the network management device after the third configuration module configures the supported network slice based on the network slice configuration information, a message that indicates that configuration of the network slice is completed.

In this embodiment of the present application, the information that indicates the network slice supported by the RAN includes:

information that indicates a network slice supported by each tracking area identity TAI configured for the RAN; or information that indicates a network slice supported by each TAI configured for each cell of the RAN.

In this embodiment of the present application, the information about the network slice includes S-NSSAI.

In this embodiment of the present application, the network slice configuration information further includes information that indicates a usable frequency of the network slice supported by the RAN.

In this embodiment of the present application, the third receiving module 601 is further configured to: receive, after receiving the network slice configuration information sent by the network management device, spectrum configuration information sent by the network management device, where the spectrum configuration information is used to indicate a usable frequency of the network slice supported by the RAN.

In this embodiment of the present application, the network slice configuration information further includes information that indicates at least one TAI configured for each cell of the RAN.

In this embodiment of the present application, the third receiving module 601 is further configured to: receive, before receiving the network slice configuration information sent by the network management device, tracking-area configuration information sent by the network management device, where the tracking-area configuration information is used to indicate the information about the at least one TAI configured for each cell of the RAN.

In this embodiment of the present application, division into the modules is an example and is merely logical function division, and may be other division during actual implementation. In addition, functional modules in the embodiments of the present application may be integrated into one processor, or each of the modules may exist alone physically, or at least two modules may be integrated into one module. The integrated module may be implemented in a form of hardware, or may be implemented in a form of a software functional module.

When the integrated module is implemented in a form of hardware, the RAN may include a processor (still referring to FIG. 9). Hardware of an entity corresponding to the configuration module may be a processor. The processor may be a central processing module, a digital processing module, or the like. The RAN may further include a transceiver. By using the transceiver, the processor receives the network slice configuration information sent by the network management device, sends, to the network management device, the message that indicates that configuration of the network slice is completed, or the like. The network management device further includes a memory, configured to store a program executed by the processor. The memory may be a nonvolatile memory such as a hard disk drive or a solid-state drive, or may be a volatile memory such as a random access memory. The memory is any other medium that can be configured to carry or store expected program code in a form of an instruction or a data structure and that is accessible by a computer, but no limitation is set thereto.

For implementation of the modules of the RAN, refer to implementation of the operations performed by the RAN device in the foregoing configuration method.

An embodiment of the present application further provides a computer-readable storage medium. The readable storage medium stores a computer instruction. When the instruction is run on a computer, the computer is enabled to perform the operations performed by the first network management device in the foregoing configuration method.

An embodiment of the present application further provides a computer-readable storage medium. The readable storage medium stores a computer instruction. When the instruction is run on a computer, the computer is enabled to perform the operations performed by the second network management device in the foregoing configuration method.

An embodiment of the present application further provides a computer-readable storage medium. The readable storage medium stores a computer instruction. When the instruction is run on a computer, the computer is enabled to perform the operations performed by the RAN in the foregoing configuration method.

This application provides a computer program product. When the computer program product is run on a computer, the computer is enabled to perform the method in any one of the first aspect or the possible implementations of the first aspect.

An embodiment of the present application further provides a computer program product. When the computer program product is run on a computer, the computer is enabled to perform the operations performed by the first network management device in the foregoing configuration method.

An embodiment of the present application further provides a computer program product. When the computer program product is run on a computer, the computer is enabled to perform the operations performed by the second network management device in the foregoing configuration method.

An embodiment of the present application further provides a computer program product. When the computer program product is run on a computer, the computer is enabled to perform the operations performed by the RAN in the foregoing configuration method.

The embodiments of the present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a function in one or more processes in the flowcharts and/or in one or more blocks in the block diagrams. These computer program instructions may alternatively be stored in a computer readable memory that can instruct the computer or any other programmable data processing device to work in a manner, so that the instructions stored in the computer readable memory generate an artifact that includes an instruction apparatus. The instruction apparatus implements a function in one or more processes in the flowcharts and/or in one or more blocks in the block diagrams.

The foregoing descriptions are merely embodiments of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A configuration method comprising:
    sending, by a first network management device of a management system, network slice configuration information and spectrum configuration information to a second network management device of the management system;
    sending by the second network management device the network slice configuration information and the spectrum configuration information to a radio access network (RAN) device;
    receiving by the RAN device the network slice configuration information and the spectrum configuration information, wherein the network slice configuration information about a network splice supported by the RAN device includes:

information that indicates a network slice supported by each tracking area identity (TAI) configured for the RAN device, or, information that indicates a network slice supported by each TAI configured for each cell of the RAN device;

configuring by the RAN device, based on the received network slice configuration information, a network slice supported by the RAN device;

configuring by the RAN device, based on the received spectrum configuration information, a useable frequency of the network slice supported by the RAN device;

sending by the RAN device to the second network management device a message that a configuration of the network slice at the RAN device is completed;

sending by the RAN device to the second network management device a message that a configuration of the useable frequency of the network slice is completed; and sending by the second network management device to the first management device the message that the configuration of the network slice at the RAN device is completed and the message that the configuration of the useable frequency of the network slice is completed.

2. The configuration method according to claim 1, wherein
the first network management device is a network manager (NM) or a network slice management function (NSMF) module, and the second network management device is an element manager (EM) or a network function (NF) manager; or
the first network management device is an NSMF module, the second network management device is a network slice subnet management function (NSSMF) module, and the EM or the NF manager is integrated into the NSSMF module; or
the first network management device is an NSSMF module, and the second network management device is an EM or an NF manager.

3. The configuration method according to claim 1, wherein before the sending, by a first network management device, network slice configuration information to a second network management device, the method further comprises:
generating or receiving, by the first network management device, the network slice configuration information.

4. A radio access network (RAN) comprising:
a receiving transceiver configured to receive network slice configuration information and spectrum configuration information sent by a second network management device of a network management system, wherein the network slice configuration information about a network splice includes: information that indicates a network slice supported by each tracking area identity (TAI) configured for the RAN device, or, information that indicates a network slice supported by each TAI configured for each cell of the RAN device;
a configuration processor configured to:
configure, based on the received network slice configuration information, a network slice supported by the RAN device;
configure, based on the received spectrum configuration information, a useable frequency of the network slice supported by the RAN device; and
a sending transceiver configured to:
send to the second network management device a message that a configuration of the network slice at the RAN device is completed; and
send to the second network management device a message that a configuration of the useable frequency of the network slice is completed, wherein, the second network management device send to a first network management device of the network management system the message that the configuration of the network slice at the RAN device is completed and the message that the configuration of the useable frequency of the network slice is completed.

5. The RAN according to claim 4, wherein the information about the network slice comprises single network slice selection assistance information (S-NSSAI).

* * * * *